J. HELLMAN.
HUB GUARD.
APPLICATION FILED MAR. 7, 1913.
1,084,739.
Patented Jan. 20, 1914.
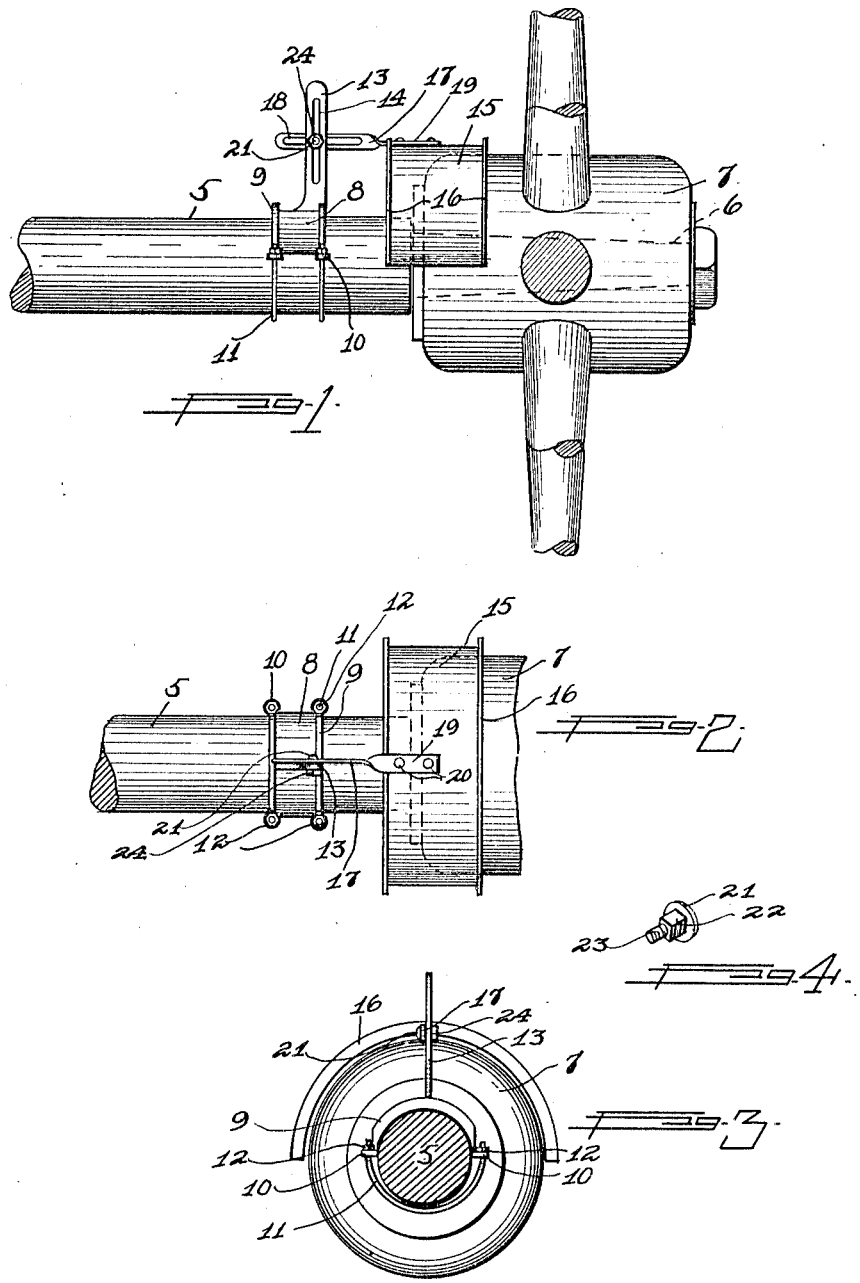
Witnesses
Jn Lyles
B. P. Fishburne
Inventor
James Hellman,
By C. L. Parker
Attorney

UNITED STATES PATENT OFFICE.

JAMES HELLMAN, OF WALSH, ILLINOIS.

HUB-GUARD.

1,084,739. Specification of Letters Patent. Patented Jan. 20, 1914.

Application filed March 7, 1913. Serial No. 752,730.

*To all whom it may concern:*

Be it known that I, JAMES HELLMAN, a citizen of the United States, residing at Walsh, in the county of Randolph and State of Illinois, have invented certain new and useful Improvements in Hub-Guards, of which the following is a specification.

My invention relates to a device for excluding sand, mud, dust or the like from the hub of a wheel and the spindle or axle carrying the same.

My invention aims to provide in a simple construction, means whereby the shield or guard which protects the hub and spindle, may be vertically moved, horizontally moved, and securely locked in adjustment at desired positions.

A further object of this invention is to provide means of the above mentioned character, which are simple in construction, durable, and cheap to manufacture.

Other objects and advantages of this invention will be apparent during the course of the following description.

In the accompanying drawings, forming a part of this specification, and in which like numerals are employed to designate like parts throughout the same, Figure 1 is a side view of the apparatus, showing the same in use, Fig. 2 is a plan view thereof, Fig. 3 is an inner end view of the same, and, Fig. 4 is a perspective view of the clamping nut.

In the drawings, wherein is illustrated a preferred embodiment of the invention, the numeral 5 designates an axle, carrying a spindle 6, upon which is rotatably mounted a hub 7 of a wheel, of any well known or preferred type.

Mounted upon the axle 5 is a curved plate 8, which is preferably provided upon its longitudinal edges with stiffening ribs 9. At its opposite ends, the plate 8 is provided with eyes 10, for receiving U-shaped bolts 11, carrying nuts 12. It is obvious that the plate 8 may be readily mounted upon the axle 5 and clamped thereto. Formed upon the plate 8 or rigidly connected therewith is an upstanding or vertical post 13, provided with a longitudinally extending slot 14.

The numeral 15 designates a curved guard or shield, which is preferably reinforced at its longitudinal edges with stiffening ribs 16. This guard or shield surrounds the upper portion of the inner end of the hub 7, excluding sand or the like from the hub and the spindle.

The numeral 17 designates a horizontal arm, which slidably engages the upstanding post 13, as shown. This upstanding arm is provided with a longitudinal slot 18, as shown. The outer portion of the arm 17 is twisted to form a flat portion 19, rigidly connected with the guard or shield 16 by means of bolts 20 or the like.

The numeral 21 designates a bolt, having a portion 22 formed square in cross-section, which portion carries a reduced screw-threaded extension 23. A clamping nut 24 is mounted upon the reduced screw threaded portion 23. The square portion 22 of the bolt 21 passes through the slots 14 and 18, whereby the bolt cannot turn upon its longitudinal axis. By this construction the clamping nut 24 may be readily turned to lock the arm 17 in adjustment at a desired position, it being understood that the square portion 22 is not quite as long as the combined thickness of the posts 13 and arm 17.

In the operation of the apparatus, the plate 8 is rigidly mounted upon the axle 5, at apparently the desired position. By unscrewing the nut 24, the arm 17 may be either raised or lowered or moved longitudinally in either direction, so that the guard or shield 15 will properly surround the inner portion of the hub 7, without disturbing the plate 8.

It is to be understood that the form of my invention, herewith shown and described, is to be taken as a preferred example of the same, and that certain changes in the shape, size and arrangement of parts may be resorted to without departing from the spirit of the invention or the scope of the subjoined claims.

Having described my invention, I claim:—

1. In apparatus of the character described, a single upstanding post provided with a longitudinal slot, means to attach the post to the axle of the vehicle, a horizontal arm provided with a longitudinal slot and disposed adjacent the upstanding post, a single adjustable clamping bolt passing through the two longitudinal slots, and a shield connected with the horizontal arm and adapted to be disposed adjacent the inner end of a hub.

2. In apparatus of the character described, the combination with a single upstanding post provided with a longitudinal slot, of means to rigidly connect the post with the axle of a vehicle at approximately the right point, a horizontal arm provided with a longitudinal slot and slidably engaging one side of the upstanding post with its slot in registration with the slot of the post, a curved shield rigidly connected with the free end of the arm, a bolt having a portion thereof formed square in cross section to fit snugly within the two slots, and a clamping nut carried by the bolt.

In testimony whereof I affix my signature in presence of two witnesses.

JAMES HELLMAN.

Witnesses:
WILLIAM FRANCOIS BUTLER,
STEPHEN EDWARD WRIGHT.

Copies of this patent may be obtained for five cents each, by addressing the "Commissioner of Patents, Washington, D. C."